United States Patent
Wipfel et al.

(10) Patent No.: US 7,793,101 B2
(45) Date of Patent: Sep. 7, 2010

(54) VERIFIABLE VIRTUALIZED STORAGE PORT ASSIGNMENTS FOR VIRTUAL MACHINES

(75) Inventors: Robert A. Wipfel, Draper, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 756 days.

(21) Appl. No.: 11/743,357

(22) Filed: May 2, 2007

(65) Prior Publication Data

US 2008/0098392 A1 Apr. 24, 2008

Related U.S. Application Data

(63) Continuation-in-part of application No. 11/583,667, filed on Oct. 19, 2006.

(51) Int. Cl.
*H04L 9/00* (2006.01)
*H04L 9/32* (2006.01)
*G06F 15/16* (2006.01)

(52) U.S. Cl. .............................. 713/168; 726/2; 726/15

(58) Field of Classification Search ................. 726/1–4, 726/6–7, 15, 26–27; 713/150, 162, 168–170, 713/189–190, 192–194
See application file for complete search history.

(56) References Cited

U.S. PATENT DOCUMENTS

| 5,619,657 | A | 4/1997 | Sudama et al. |
| 5,684,950 | A | 11/1997 | Dare et al. |
| 5,832,487 | A | 11/1998 | Olds et al. |
| 6,014,667 | A | 1/2000 | Jenkins et al. |
| 6,157,925 | A | 12/2000 | Jenkins et al. |
| 7,047,290 | B2 | 5/2006 | Murotani et al. |
| 7,107,332 | B2 | 9/2006 | Murotani et al. |
| 7,164,448 | B2 | 1/2007 | Iipko et al. |
| 7,174,458 | B2 | 2/2007 | Araki et al. |
| 7,685,206 | B1 | 3/2010 | Mathew et al. |
| 7,698,400 | B1 | 4/2010 | Beloussov et al. |
| 2002/0075306 | A1 | 6/2002 | Thompson et al. |
| 2004/0001490 | A1* | 1/2004 | Shima ...................... 370/395.2 |
| 2004/0230799 | A1 | 11/2004 | Davis |
| 2004/0268140 | A1 | 12/2004 | Zimmer et al. |
| 2005/0010811 | A1 | 1/2005 | Zimmer et al. |
| 2005/0135425 | A1 | 6/2005 | Hall et al. |

(Continued)

FOREIGN PATENT DOCUMENTS

WO    WO-0069110    11/2000

OTHER PUBLICATIONS

Dugan, Robert, "NPIV Functionality Profile", *IBM Corporation, INRANGE Technologies Corp*, (Aug. 5, 2002), 1-7.

*Primary Examiner*—Hosuk Song
(74) *Attorney, Agent, or Firm*—Schwegman, Lundberg & Woessner, P.A.

(57) ABSTRACT

Techniques for verifiable virtualized storage port assignments in virtual machines are provided. Configuration data for a virtual machine is defined to include a mechanism to verify an identity for the virtual machine in a target physical environment and a mechanism to verify a storage port assignment for use in the target physical processing environment. Before the target physical processing environment initiates the virtual machine an identity for the virtual machine is acquired, the configuration data is verified and the storage port assignment is verified.

23 Claims, 5 Drawing Sheets

U.S. PATENT DOCUMENTS

| | | |
|---|---|---|
| 2005/0246708 A1 | 11/2005 | Turner et al. |
| 2005/0289471 A1 | 12/2005 | Thompson et al. |
| 2006/0050888 A1 | 3/2006 | Svensson |
| 2006/0144927 A1 | 7/2006 | Love et al. |
| 2006/0155667 A1 | 7/2006 | Tolba |
| 2006/0200424 A1 | 9/2006 | Cameron et al. |
| 2006/0212934 A1 | 9/2006 | Cameron et al. |
| 2006/0233367 A1 | 10/2006 | Birrell et al. |
| 2006/0282701 A1 | 12/2006 | Davies et al. |
| 2007/0038866 A1 | 2/2007 | Bardsley et al. |
| 2008/0098457 A1 | 4/2008 | Carter |

* cited by examiner

VERIFIABLE VIRTUALIZED STORAGE PORT ASSIGNMENTS FOR VIRTUAL MACHINES

RELATED APPLICATION

The present invention is co-pending with and is a Continuation-In Part of U.S. application Ser. No. 11/583,667 entitled "Identity Controlled Data Center," filed on Oct. 19, 2006; the disclosure of which is incorporated by reference herein.

FIELD

The invention relates generally to security and more particularly to techniques for verifiable virtualized storage port assignments in virtual machines.

BACKGROUND

Increasingly enterprises are attempting to utilize existing technology to conduct business and affairs in a distributed and more automated manner. For example, enterprises are now capable of deploying software services to remote facilities or customers over the Internet.

One technique for achieving this is the creation of a virtual machine (VM). A VM is a software abstracted layer that is partitioned within a physical machine environment to create and establish a different and dual environment from that which is associated with the physical machine. A single machine can have multiple VM's. Essentially, a VM acts as an independent environment and machine that is different from the physical machine on which it processes.

Yet, establishing a VM is not an automated exercise by any means and involves a variety of configuration settings. The VM has to be self-sustaining as an independent logical machine that actually uses the physical resources of a different machine. So, proper configuration of services within the VM is vital.

Another concern is a storage system used in the target physical environment for the VM. Specifically, modern storage systems largely exist to provide storage redundancy, flexible storage density, flexible storage assignment, storage access security, flexible storage sizing, etc. Yet, it has become increasingly difficult for modern data centers to host critical enterprise data on disk subsystems, which may be associated with only one computer. This situation is compounded by the pressure to consolidate execution environments in the data center and to use those environments more effectively.

Typically, a storage device includes a single physical port where access is obtained to the storage device. That port has to be used by the services of a VM if external storage beyond local direct-attached storage is to be used with the VM, which is necessary for VM's that have persistent data. To permit this, the VM or VM services have to include another application that provides access to the storage device and the VM services have to be pre-configured to interact with that application or the VM services have to be pre-configured to directly know and access the proper storage port. Additionally, there is little to no security that is capable of being applied to the port access. So, a VM service with access to a storage port can access the storage even when that VM service may be a rogue service with malicious designs. In fact, there is little to no security applied at the storage port.

Consequently, establishing VM's is a complicated exercise that lacks a substantial amount of security. Thus, what is needed is a mechanism, which allows for verifiable and flexible storage port assignments within virtual machines.

SUMMARY

In various embodiments, techniques for verifiable virtualized storage port assignments in virtual machines are provided. More specifically, and in an embodiment, a method is provided for defining a virtual distribution associated with a virtual machine. Control data is established for a virtual distribution that is to be subsequently initiated as a virtual machine within a target physical processing environment and a target physical machine. The control data identifies processor and memory resources and a virtual distribution identity acquired to initially verify the virtual machine. Next, storage data is defined for the virtual distribution to identify a port to communicate with physical storage on the target physical processing environment that the processing and memory resources use within the virtual machine. The storage data is also used to identify a storage designator to assist in verifying the port before the virtual machine is operational in the target physical processing environment. Finally, an identity service is used for signing the storage data to bind it with the control data of the virtual distribution.

DETAILED DESCRIPTION

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A "virtual processing environment" refers to a software constructed sub processing environment that is carved out from or superimposed on a portion of a physical processing environment. A single physical processing environment can have a plurality of different or cloned "virtual processing environments."

The processing environments (physical and virtual) as used herein are configured to participate in a virtualized data center. A "virtualized data center" refers to a platform or environment for executing one or more similar services or applications. For example, an enterprise may deploy a suite of services for use, some of the service may be related to administration, audit tracking, security, maintenance, etc. of other ones of the deployed services. Thus, the platform or environment can include a variety of services, some of which may share features and some of which may be independent of the other services.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "temporary access token" as used herein refers to a temporary identity supplied to a resource for temporary use until a more permanent identity can be established. Furthermore, as used herein a "service provider" (SP) refers to a special type of service or resource that utilizes identities vended by a trusted identity service on behalf of other resources.

An "orchestration service" is another specialized resource or service that provides a mechanism for orchestrating the deployment, cloning, moving, terminating, etc. of virtual processing environments included within a physical processing environment.

An example of a virtualized data center that is identity based and provides increased security beyond what has been known in conventional approaches may be found in U.S. application Ser. No. 11/583,667 entitled "Identity Controlled Data Center," filed on Oct. 19, 2006; the disclosure of which is incorporated by reference herein.

Embodiments of the present invention are improvements to the "Identity Controlled Data Center," which provide for verifiable virtualized storage port assignments within virtual machines.

A "virtual machine" (VM) may be viewed as a virtual processing environment discussed and described above. The VM is a logical machine that is independent of its physical process environment or physical machine. It may include its own operating system (OS), its own file system (FS), its own directory services, etc., which may each be different from the physical processing environment.

A VM may also be referred to herein as a "virtual distribution." Similarly, a physical processing environment may be referred to as a "physical distribution."

Techniques presented herein and below may also be integrated with N-Port ID Virtualization (NIPV). This can be done by having the specialized service described herein and below as a Storage Resource Manager interact with NIPV services to acquire a virtualized port assignment for a virtual distribution. The Storage Resource Manager may then be used to verify this virtualized port assignment within a target physical distribution in the manners discussed herein and below.

Various embodiments of this invention can be implemented in existing network architectures, storage systems, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-6.

Figure 1:
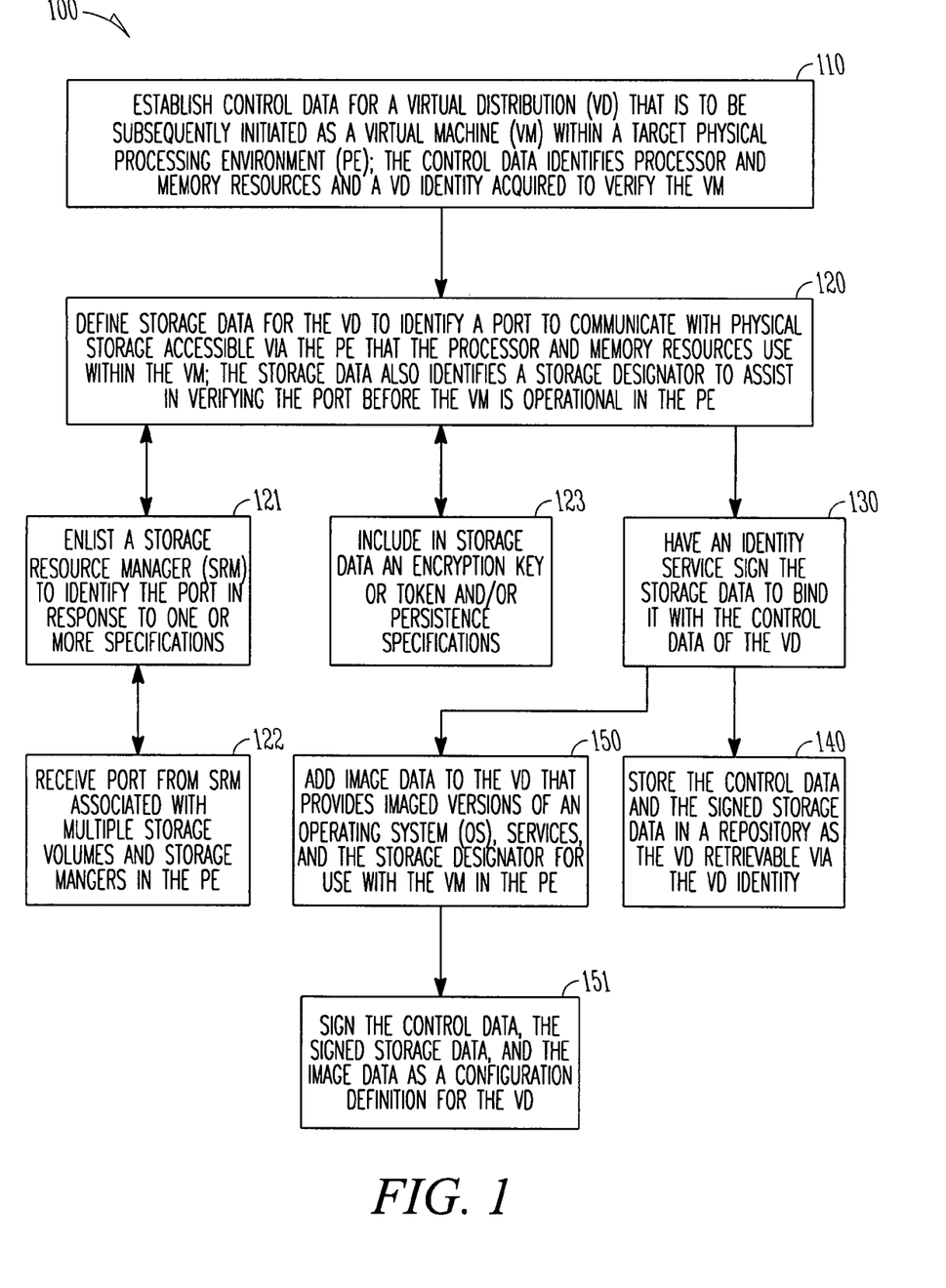
FIG. 1 is a diagram of a method for defining a virtual distribution associated with a virtual machine, according to an example embodiment.

FIG. 1 is a diagram of a method 100 for defining a virtual distribution associated with a virtual machine (VM), according to an example embodiment. The method 100 (hereinafter "VM packaging service") is implemented as instructions in a machine-accessible and readable medium. The instructions when executed by a machine perform the processing depicted in FIG. 1. The VM packaging service is also operational over and processes within a network. The network may be wired, wireless, or a combination of wired and wireless.

At 110, the VM packaging service establishes control data for a virtual distribution (VD) that is to be subsequently initiated as a VM within a target physical processing environment (PE) and physical machine. The control data can include a variety of information that is relevant to the PE, such as but not limited to processor and memory resources and a VD identity, which is used by the PE to verify the VM.

The Identity Controlled Data Center techniques (pending U.S. application incorporated by reference above and from which this disclosure builds upon) provide a variety of mechanisms in which an orchestrator and remote identity service dynamically interact with and authenticate a PE to acquire operating data. In an embodiment, this operating data may be viewed as the control data. Additionally, the manner in which the VD identity is established or temporary access token is supplied to the control data is described in detail with the Identity Controlled Data Center Techniques. So, the PE (target physical processing environment or target physical distribution) is selected for a VD and control data is established and that control data includes an initial and temporary VD identity.

At 120, the VM packaging also augments the control data by defining storage data for the VD. The storage data identifies a storage port that is to be used for communication with physical storage in the PE. Furthermore, the control data defined processor and memory resources within the VM can use the storage port for access to physical storage once initiated within the PE.

The storage data also identifies a storage designator. A storage designator is a special type of service, such as the service provider discussed in the Identity Controlled Data Center techniques, which processes when the VD is initiated as a VM in the PE. The storage designator verifies the storage port in the PE before the VM is initiated. This is discussed in greater detail below with reference to the method 300 of the FIG. 3. In some cases, the storage designator may be a storage resource manager (SRM) discussed in greater detail herein and below. The SRM interacts with the physical storage and storage managers to supply port access to the VM for physical storage of the PE.

In an embodiment, at 121, the VM packaging service may enlist a SRM to identify the storage port for use in the storage data, this port may be resolved in response to one or more specifications or policies that a user defines. Accordingly, at 122, the VM packaging service can receive the port from the SRM and that port may in some cases be associated with multiple storage volumes and storage managers on the PE.

In still more situations, at 123, the VM packaging service may include a variety of other information in the storage data. For example, the storage data may include an encryption key or an encryption token that can be used to encrypt storage within the VM on the PE and its physical storage when the VD is initiated as the VM. The storage data may also include persistence specifications. Persistence specifications may identify situations in which storage accessed and modified by the VM during its life-cycle is to survive or persist when the VM terminates and ceases to exist. So, the physical storage used by the VM via the storage port and the SRM may be cleared or made available for other uses after the VM terminates (non persistent) or it may persist after the VM terminates for other VM's or the PE to use as it was left by the terminated VM.

At 130, the VM packaging service enlists an identity service to sign the storage data. This binds the storage data and the storage port with the control data of the VD. Example identity services were discussed and incorporated by reference above. The signature provides added security to the storage port and its other related configuration information, such as the storage designator, the encryption key, and/or the persistence specifications.

According to an embodiment, at 140, the VM packaging service may store the control data and the signed storage data in a data repository. This data is associated with the VD identity and may be searched and retrieved from the repository. A collection of VD's may be established for particular systems on particular PE's and housed in the repository for subsequent use.

In another situation, at 150, the VM packaging service adds image data to the VD. The image data includes imaged versions of such things as a desired operating system (OS), desired files system (FS), desired directory services, the storage designator, and other services that are used on the PE with the VD when the VD is initiated as a VM on the PE. These services are preconfigured and imaged, such that when re-imaged they become available and execute on the PE as the VM defined by the VD. At 151, the control data, the signed storage data, and the image data may also be signed by the identity service or another trusted entity and assembled as a configuration definition for the VD. The signature may be verified when the VM associated with the VD is initiated on the PE.

The VM packaging service provides a mechanism that builds on the Identity Controlled Data Center techniques for defining a VD that can subsequently be verified on a target PE before a VM representing the VD is established and initiated on the PE. The VM packaging service augments the Identity Controlled Data Center techniques by establishing verifiable virtualized storage ports for use in the configuration information of the VD being defined. An example, architecture and additional discussion for the VM packaging service is described below with reference to the FIG. 2. Additionally, discussion on how the VD is instantiated and verified on a target PE is described in detail below with reference to the method 300 of the FIG. 3.

Figure 2:
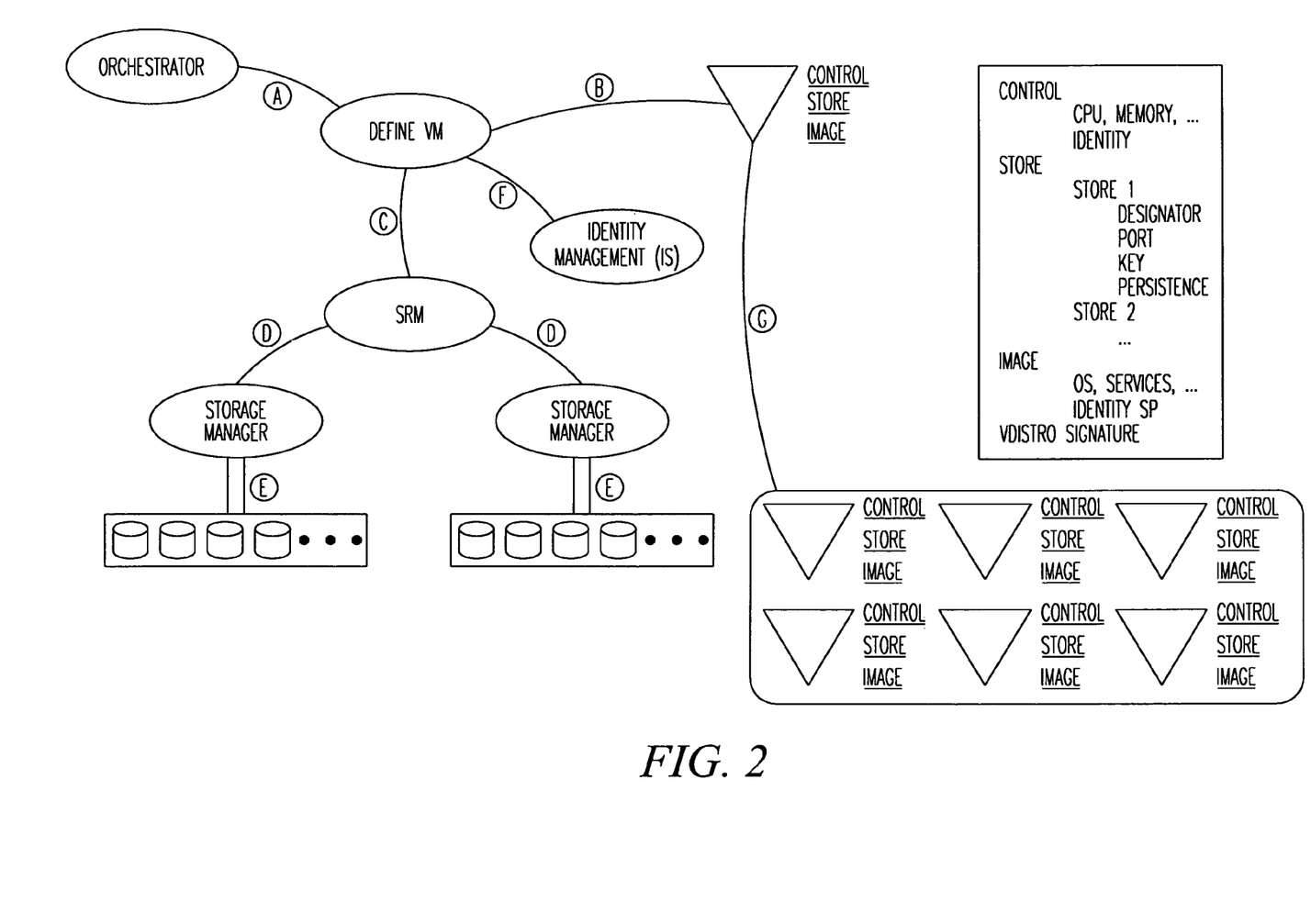
FIG. 2 is a diagram of example interactions for an architecture associated with the method depicted in FIG. 1, according to an example embodiment.

FIG. 2 is a diagram of example interactions for an architecture associated with the method depicted in FIG. 1, according to an example embodiment. The diagram includes a variety of resources and interactions that these resources have with one another for purposes of initially authenticating a target physical processing environment (physical distribution) and setting it up for subsequent deployment of virtual processing environments (virtual distributions) and applications that may execute within those virtual distributions. The diagram also illustrates how a virtualized port assignment may be securely packaged and included with the virtual distributions.

Initially, an orchestrator (described with the Identity Controlled Data Center techniques) is used by data center personnel to manage a virtualized data center. One of the tasks of the orchestrator is the initial definition of a VD and the maintenance of that VD afterward. This can be achieved via link A in FIG. 2.

The Define VM task in FIG. 2 may be viewed as the VM packaging service discussed above with reference to the method 100 of the FIG. 1. The Define VM task proceeds to build/maintain a VD configuration using link B. The configuration may include four main components: control, store, image, and signature.

The control section provides the configuration and policy statements that can be used when instantiating the VD as a VM on the PE to make sure that the correct resources are assigned and made available by the PE (physical distribution). Again, this is discussed in greater detail with the Identity Controlled Data Center techniques. Similarly, the control section includes an VD identity and establishment of that initial VD identity (also described in detail with the Identity Controlled Data Center techniques). The image section provides for the definition of the execution environment for the target PE including the use of a specialized service provider (SP), which is described with the Identity Controlled Data Center techniques. The VDistro Signature is a digital signature that protects the configuration data for the VD from being tampered with. VDistro stands for Virtual Distribution in the FIG. 2.

The store section is describes in detail above with reference to the VM packaging service represented by the method 100 of the FIG. 1. The store section provides for the definition of storage restrictions and requirements that can be used by the VD. The mundane assignment of scratch storage local to the PE is not discussed. However, there the need to specify storage in terms of access to shared storage is described with reference to the virtualized storage port included in the VD store section.

The VD's access to one or more SRM's is defined via specifications from a user that defines the VD initially via link C in the FIG. 2. The SRM interrogates the various storage managers via link D in the FIG. 2. The storage managers manage the physical shared storage via E. The end result is that the SRM can provide and acquire a reference port to the needed physical storage that can be passed back to the Define VM task via C.

The storage definition is then assembled and signed by an Identity Management Service (IS) via link F of the FIG. 2 so that it can be bound to the specific VD. As an example, "Store1" is seen in the configuration data of the FIG. 2 that it holds a configuration that defines a storage designator (e.g., name in the SRM namespace), storage port, key (for encrypted storage management—the key may actually be a token or SAML assertion that allows the identity service (IS) to provide the actual key), persistence specifications (should the storage be persisted beyond the execution of the VD), etc.

Finally, the VD can be signed, perhaps by the identity service (IS), and stored along with other VD's via link G in the FIG. 2.

Figure 3:
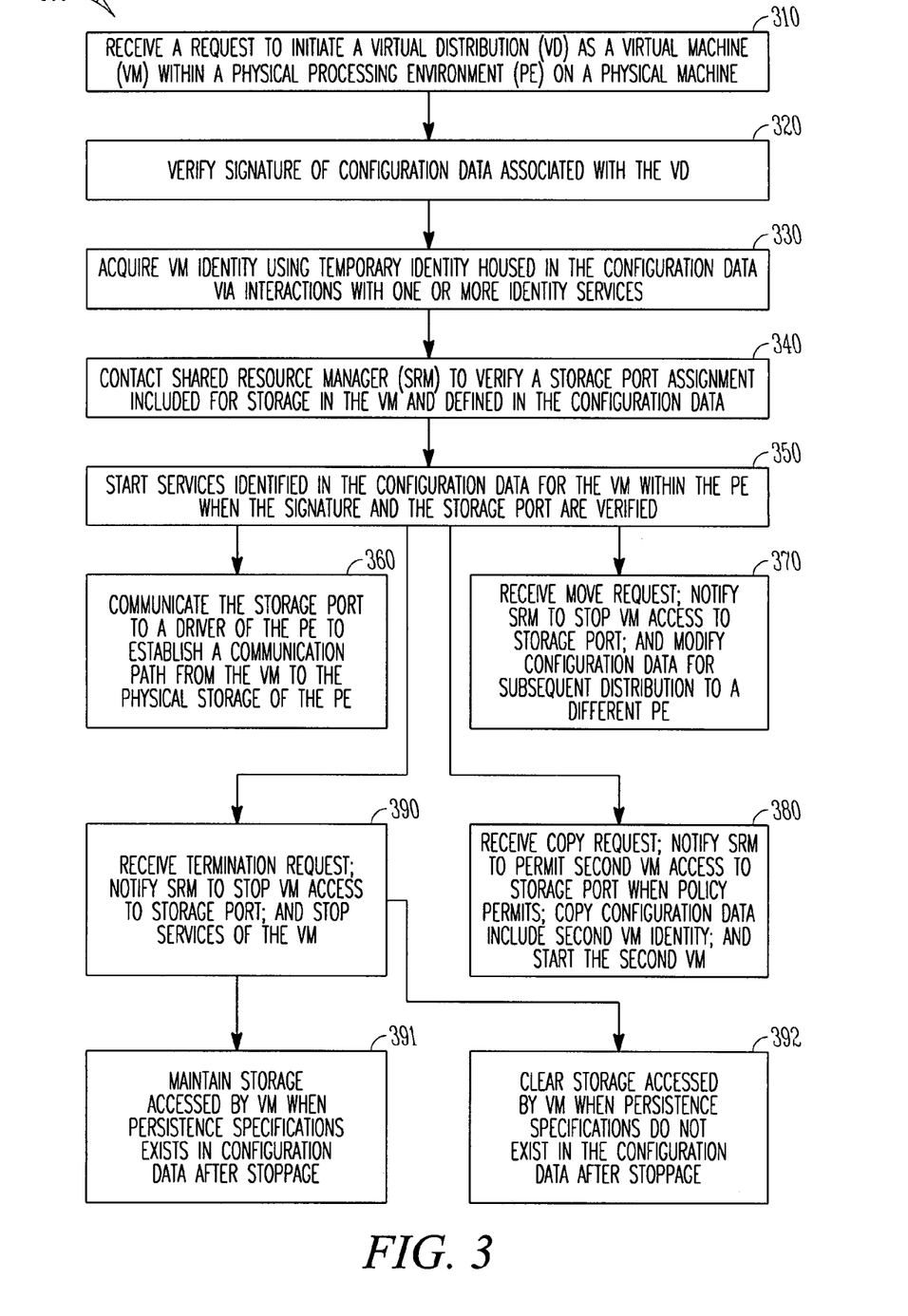
FIG. 3 is a diagram of method for remotely verifying and establishing a virtual machine within a physical processing environment, according to an example embodiment.

FIG. 3 is a diagram of method 300 for remotely verifying and establishing a virtual machine within a physical processing environment, according to an example embodiment. The method 300 (hereinafter "VM initiation service" is implemented in a machine-accessible and readable medium as instructions. The instructions when executed by a machine perform the processing depicted in the FIG. 3. Moreover, the VM initiation service is operational over a network, and the network may be wired, wireless, or a combination of wired and wireless.

The VM initiation service complements and adds features and functions to what was described above with respect to the method 100 of the FIG. 1. The VM initiation service is also used to deploy, instantiate, clone, move, terminate, etc. virtual processing environments (VM's or virtual distributions) in authenticated and trusted physical processing environments (physical distributions or PE's).

At 310, the VM initiation service receives a request to initiate a VD as a VM within a physical processing environment on a physical machine (PE). Again, an orchestration service may be used to initiate the request that is received by the VM initiation service. Policy may drive when the orchestrator sends or raises the request. Moreover, the orchestrator can acquire the specific VD from a data repository as discussed above with reference to the FIGS. 1 and 2.

At 320, the VM initiation service verifies a signature associated with configuration data that defines the VM. The configuration data was defined above in detail with reference to the FIGS. 1 and 2. The signature may be associated with an external or remote identity service that assisted in creating the configuration data and establishing an initial identity for the VD.

At 330, the VM initiation service acquires a permanent VM identity using a temporary identity housed in the configuration data via interactions with one or more identity services. Examples of this are presented in detail with the Identity Controlled Data Center techniques. In some cases, the temporary identity is handled by a special service provider (SP) that contacts a local identity service on the PE and supplies the temporary identity. That local identity service contacts a remote identity service to verify the temporary identity and then the local identity service provides a unique identity for the VM within the PE.

At 340, the VM initiation service contacts a storage resource manager (SRM) or a storage designator to verify a storage port assignment for storage in the VM and defined in the configuration data. The reference to the SRM may be included in the configuration data as well or may be resolved by the SP that is identified as the storage designator in the configuration data. The SRM contacts storage managers and verifies the port assignment. This verifies the previously assigned virtualized storage port before the VM is initiated on the PE. So, the virtualized storage port is verifiable in the PE via the SRM.

At 350, the VM initiation service starts services identified in the configuration data for the VM within the PE when the signature and the storage port are verified. It is noted that at any point in which the signature, the identity of the VM, and the storage port are not verified the VM will not be initiated and the services will not be started. Logging and reporting may be used as well as audit compliance techniques for the entire process described in the FIG. 3.

According to an embodiment, at 360, the VM initiation service communicates the storage port to a PE driver service for purposes of establishing a communication path from the VM to the physical storage of the PE. This can be done via the SRM, such that services issuing storage commands are redirected to the SRM and the SRM forwards to the PE driver to be sent to the proper storage manager and storage port to access the physical storage.

In some cases, at 370, the VM initiation service may also receive a move request. The move request is associated with moving a VD to a different PE. Thus, the VM initiation service can notify the SRM to stop all VM access to the storage port. Of course pending writes or volatile operations may be permitted to flush from memory to the storage. The VM initiation service also modifies the configuration data for a subsequent VD to a different PE.

Similarly, at 380, the VM initiation service may receive a copy request. The copy request is associated with copying the VD as a new and second VD on the same PE. To do this, the VM initiation service notifies the SRM to permit the second VM to access the storage port, when policy permits. That is, policy may not allow multiple VM's to simultaneously access the same storage port. Assuming policy permits, the VM initiation service copies the configuration data for the VM and acquires a second identity from the second VM for use in the second VM and then starts the second VM on the PE.

It may also be the case, at 390 that the VM initiation service receives a termination request. A termination request is to stop the VM within the PE. In response to this termination request, the VM initiation service notifies the SRM to stop all VM access to the storage port. Again, pending volatile operations may be permitted to flush to the physical storage. Next, the services are stopped for the VM.

According to an embodiment, at 391, the VM initiation service may maintain storage that was accessed by the VM when persistence specifications existed in the configuration data indicating that storage was to remain persistent beyond the life of the VM or after VM stoppage. However, at 392, the VM initiation service may clear or make the storage available for use when persistence specifications do not exist in the configuration data after VM stoppage.

Figure 4:
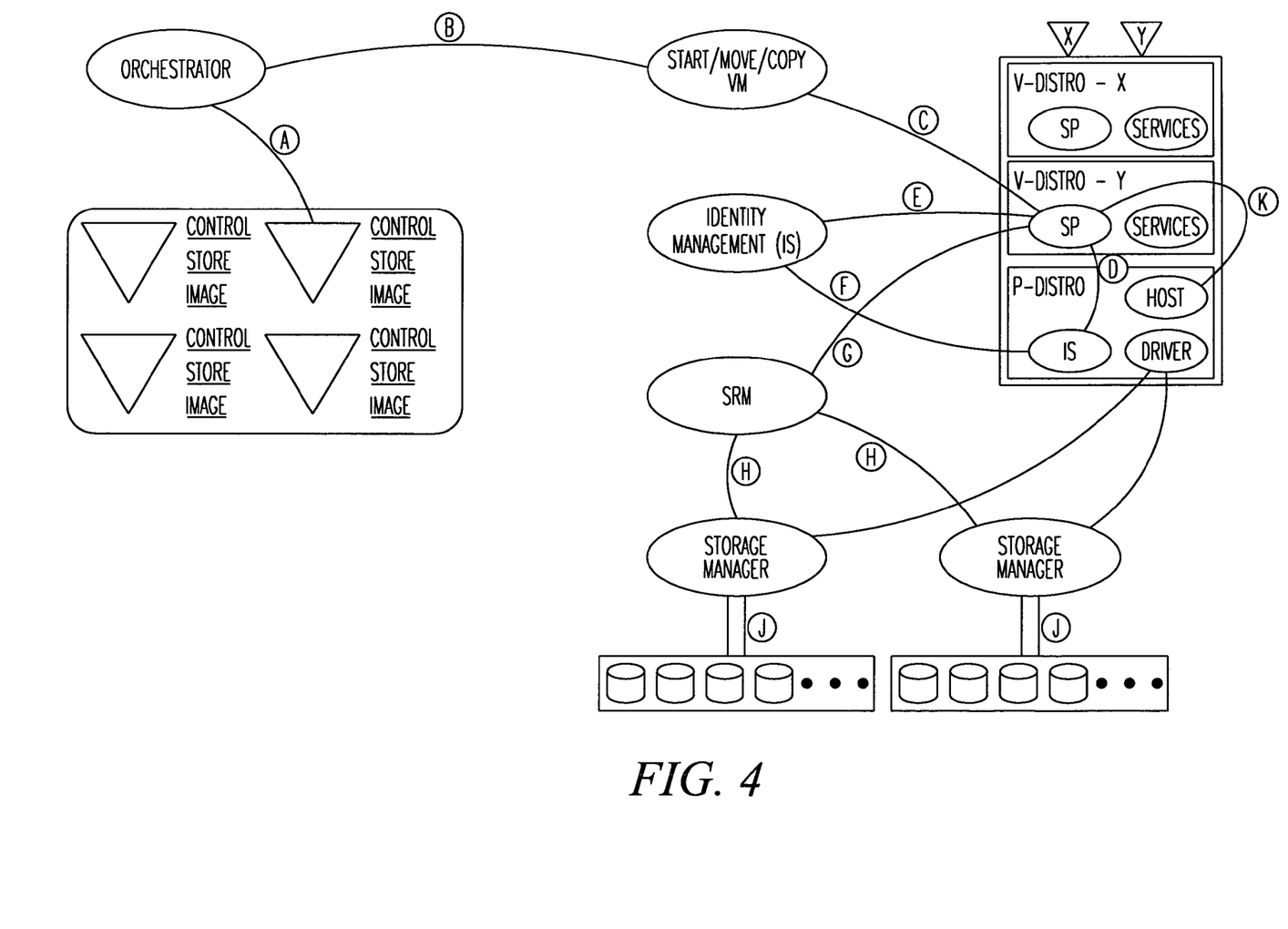
FIG. 4 is a diagram of example interactions for an architecture associated with the methods depicted in FIGS. 1 and 3, according to an example embodiment.

It is now appreciated how a virtualized storage port for a VM may be established and verified with the instantiation of a VD. The definition of the VD and storage port was defined above with reference to the FIGS. 1 and 2. FIG. 4 now describes an example architecture for achieving the processing associated with the VM initiation service represented by the FIG. 3.

FIG. 4 is a diagram of example interactions for an architecture associated with the methods depicted in FIGS. 1 and 3, according to an example embodiment. The diagram includes a variety of resources discussed with the methods 100 and 300 of the FIGS. 1 and 3, respectively. Moreover, the diagram illustrated interactions that there resources have with one another to establish authentication and trust with one another via identity creation, management, and distribution. The resulting identity-based architecture permits virtual data centers to be dynamically distributed, cloned, moved, terminated, etc. within a physical processing environment and permits virtualized storage ports to be assigned, authenticated, and instantiated for VM's (virtual distributions).

The rectangle box on the right includes a variety of other smaller rectangles. The V-Distro—X represents a particular VM for a VD identified by the configuration data X (represented by the upside down triangle X. Similarly, the V-Distro—Y represents a particular VM for a VD identified by the configuration data Y (represented by the upside down triangle Y. The P-Distro represents the PE from which the VD's are layered on top of. The P-Distro includes its own Identity Service (IS), physical storage driver and host processes. Each VD includes a specialized service provider SP (discussed in detail with the Identity Controlled Data Center techniques), which knows how to contact the local IS of the PE and contact the SRM and a remote identity service (also labeled IS in FIG. 4). With this background information, FIG. 4 is now discussed in greater detail.

An orchestrator access a library of VD's via link A in the FIG. 4 and initiates the process to start, clone, move, copy a particular VD within a PE as a VM via links B and C. The operations initiate the VD in the PE as provided with the Identity Controlled Data Center techniques. Specifically, the link flows D, E, and F reference processing which serves to instantiate the VD on the PE according to policy and identity assignment and authentication as discussed with the Identity Controlled Data Center techniques.

The SP (or other service cooperating with the SP/IS trust model) to provide a port/reference assignment to the SRM via G, which results in validation via H and J. If all is well and the port reference can be honored, the disposition is passed back via G. This then allows the SP (or other service cooperating with the SP/IS trust model) to communicate with the PE to provide the port reference for access to the shared storage (such as via paths from the PE driver to the physical storage managers (not labeled specifically in the FIG. 4)).

If the VD is to be moved, the SP (or other service cooperating with the SP/IS trust model) notifies the SRM that the port is being moved and to stop allowing access via G. The image of the VD is then assembled and moved to another PE via the orchestrator and the process described above is used to re-instantiate the port for use by the new VD on the new PE.

If the VD is to be copied then this same process takes place but the SRM is notified that another port will be instantiated and to expect the additional port access. Note that this mechanism is valid when the storage configuration specifies that multiple uses of the port is to be allowed and that the port request can be honored by the SRM (e.g., its policy may forbid multiple uses of certain types of storage ports, etc.).

Termination of the VD is similar to a move except that the image of the VD is not re-instantiated.

It is because of the trust model established with the Identity Controlled Data Center techniques and the interaction of identity with the identity services and other components of the virtualized data center that each access request is secure and bound by policy. Note also that if the port reference is for scratch or temporary storage on the shared storage mechanism that this too is controlled and managed by policy, including persistence of the scratch or temporary storage allocation.

Figure 5:
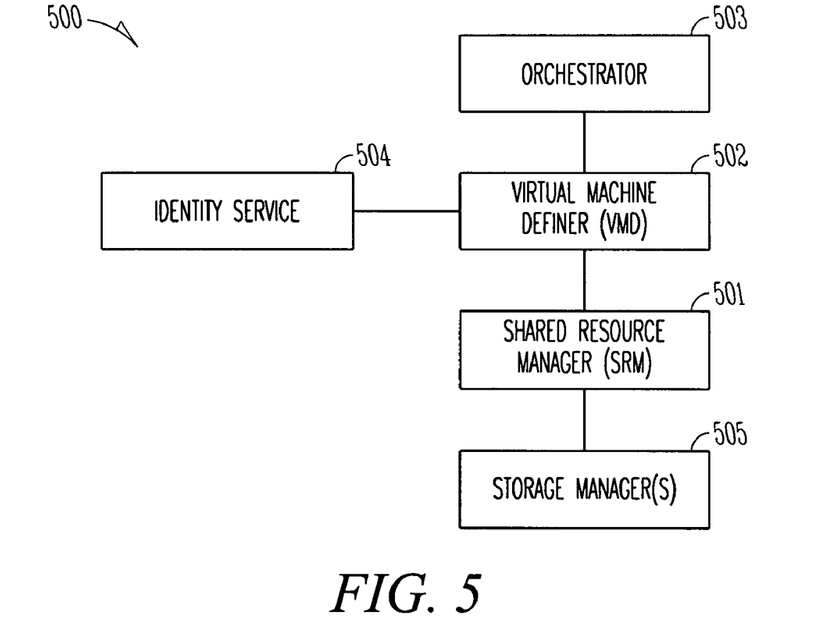
FIG. 5 is a diagram of a virtual machine defining system, according to an example embodiment.

FIG. 5 is a diagram of a virtual machine defining system 500, according to an example embodiment. The virtual machine defining system 500 is implemented as instructions on or within a machine-accessible and readable medium. The instructions when executed by a machine perform the processing depicted in the method 100 of the FIG. 1. The virtual machine defining system 500 is operational over a network that may be wired, wireless, or a combination of wired and wireless.

The virtual machine defining system 500 includes a storage resource manager (SRM) 501 and a virtual machine definer (VMD) 502. The virtual machine defining system 500 may also include one or more of the following: an orchestrator 503, an identity service 504, and one or more storage managers 505. Each of these and there interactions with one another will now be discussed in turn.

The SRM 501 is implemented in a machine-accessible and readable medium and is to process on a machine. The SRM 501 is called initially during a VM defining or configuration process to provide a valid storage reference port to shared storage for a VM. The SRM 501 or other instances of the SRM 501 may be subsequently called when the VM is being instantiated to verify the virtualized storage reference port and to establish a legitimate communication path between the VM and the shared physical storage via physical storage managers and/or drivers on the PE. Example processing associated with the SRM 501 was described in detail above with reference to the FIGS. 1-4. The SRM 501 provides a mechanism for pre-assigning shared storage port references to a VD or VM and the mechanism for verifying that shared storage port reference when the VD is instantiated as a VM on a PE.

The VMD 502 is implemented in a machine-accessible and readable medium and is to process on a machine. The VMD 502 was described in detail above with reference to the FIGS. 1 and 2. The VMD 502 interacts with a PE; perhaps an orchestrator 503 and identity service 504; and the SRM 501 for purposes of initially defining configuration data for a VD. The configuration data includes control data, storage data, image data, and a signature of the identity service 504. The storage data is acquired via the SRM 501 and may include other information beyond just the shared storage port assignment reference, such as encryption keys or tokens and persistence specifications. The storage data also includes a reference to a storage designator in the PE, such as a SP or the SRM 501. The VD's created as configuration data by the VMD 502 may also be stored in a repository or library for subsequent use.

In some cases, the virtual machine defining system 500 also includes an orchestrator 503. The orchestrator 503 is implemented in a machine-accessible and readable medium and is to process on a machine. The orchestrator 503 acquires VD or starts the process or defining, cloning, moving, copying, and/or terminating a VD. The orchestrator 503 may also be used to manage VD after initial definition. Example features and interactions of the orchestrator 503 were provided above with reference to the FIGS. 2 and 4.

In yet more cases, the virtual machine defining system 500 includes an identity service 504. The identity service 504 is implemented in a machine-accessible and readable medium and is to process on a machine. Examples of the identity service 504 was described in detail above and incorporated by reference above. The identity service 504 provides the trust and management or identities and provides signatures to ensure that each access is trusted and secure. Interactions of the identity service 504 with other components (including local PE identity services) and the VMD 502 were described in detail above with reference to the FIGS. 1-4.

In another situation, the virtual machine defining system 500 includes one or more storage managers 505. The storage managers 505 are implemented in a machine-accessible and readable medium and is to process on a machine. The storage managers 505 interact with the SRM 501 to provide a valid storage reference port to shared storage. The SRM 501 interacts with the storage managers 505 to permit a VM (instantiated VD on a PE) to access shared storage via a storage reference port included and verified by the SRM 501 in the configuration data from the VD.

Figure 6:
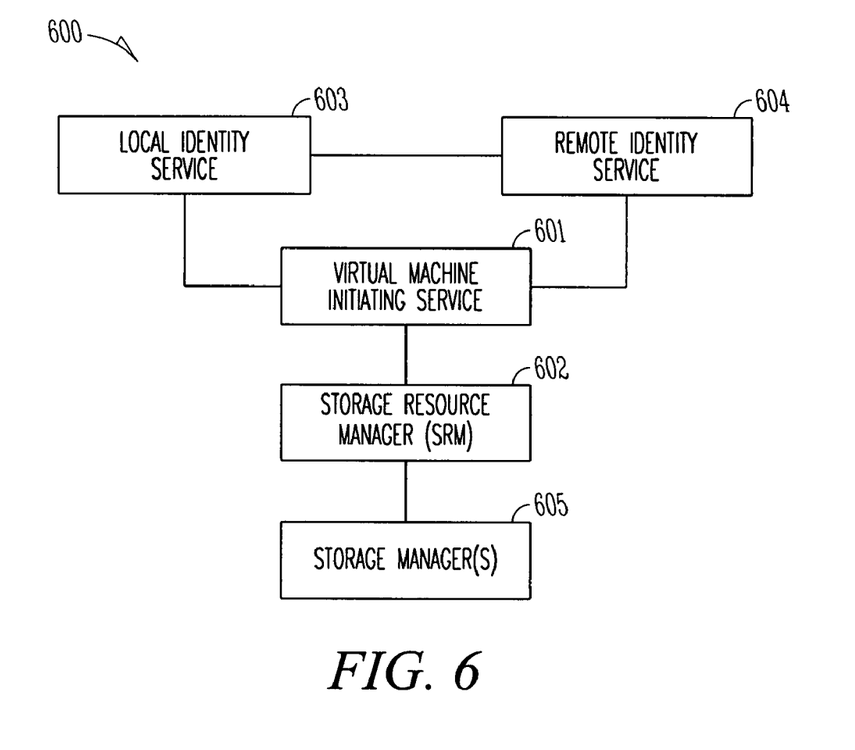
FIG. 6 is a diagram a virtual machine verifying and initiating system, according to an example embodiment.

FIG. 6 is a diagram a virtual machine verifying and initiating system 600, according to an example embodiment. The virtual machine verifying and initiating system 600 is implemented as instructions on or within a machine-accessible and readable medium. The instructions when executed by one or more machines perform processing depicted with respect to the method 300 of the FIG. 1. The virtual machine verifying and initiating system 600 is also operational over a network and the network may be wired, wireless, or a combination of wired and wireless.

The virtual machine verifying and initiating system 600 includes virtual machine initiation service 601 and a storage resource manager (SRM) 602. In some cases, the virtual machine verifying and initiating system 600 may also include one or more identity services 603 and 604 and/or one or more storage managers 605. Each of these will now be discussed in turn.

The virtual machine initiation service 601 is implemented in a machine-accessible and readable medium and is to process on a machine. The physical machine or environment that a virtual distribution or VM is to be installed on. The virtual machine initiation service 601 interacts with a local identity service 603 and a remote identity service 604. The manner in which this interaction occurs is described in detail with the Identity Controlled Data Center techniques.

The virtual machine initiation service 601 may also be called by an orchestrator to instantiate a VD, move a VD, clone or copy a VD, terminate a VD, etc.

The virtual machine initiation service 601 acquires an identity for the VD by requesting that a local identity service 603 use a temporary access token or identity included in the configuration data to contact the remote identity service 604 and acquire a permanent unique identity for the VD in the PE. The virtual machine initiation service 601 also interacts with the SRM 602 to verify a storage port included in the configuration data from the VD for use by a VM within the PE via reference to the storage port.

The virtual machine initiation service 601 is also to start services within the PE for a VM when the VD is instantiated or verified in terms of identity and in terms of the storage port assignment. Imaged versions of the services are provided with the configuration data or are obtainable via information included in the configuration data.

The SRM 602 is implemented in a machine-accessible and readable medium and is to process on a machine, which may or may not be the physical machine that the VM is initiated on. The SRM 602 interacts with the virtual machine initiation service 601, the instantiated VD as a particular VM, and one or more storage managers 605. The SRM 602 verifies configuration data supplied shared storage port references and provides a conduit through which storage commands from a processing VM may be properly forwarded and handled by the proper storage managers 605.

In some cases the virtual machine verifying and initiating system 600 also includes one or more identity services 603 and 604. Each identity service 603 and 604 is implemented in a machine-accessible and readable medium and each is to process in a different environment and on a different machine. A local identity service 603 is in a trusted and secure relationship with a remote identity service 604. The local identity service 603 can validate a temporary identity of a VD via the remote identity service 604 and can supply a permanent unique identity to the VD within the context of the PE. The remote identity service 604 provides validation, signature, and temporary identity services to the local identity service 603 and in some cases the SP's (described above).

Additionally, the virtual machine verifying and initiating system 600 may also include one or more storage managers 605. Each storage manager 605 is implemented in a machine-accessible and readable medium and is to process on one or more machines, some if which may or may not be the physical machine that the VM is initiated on. The storage managers 605 know how to access the physical shared storage and how to acquire a particular storage port for contacting physical storage. The storage managers 605 interact with the SRM 602 to supply port references and to supply operations to the physical storage.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

establishing control data for a virtual distribution that is to be subsequently initiated as a virtual machine within a target physical processing environment and a target physical machine, wherein the control data identifies processor and memory resources and a virtual distribution identity acquired to initially verify the virtual machine;

defining storage data for the virtual distribution to identity a port to communicate with physical storage on the target physical processing environment that the processing and memory resources use within the virtual machine, and wherein the storage data is also to identify a storage designator to assist in verifying the port before the virtual machine is operational in the target physical processing environment, defining the storage data to include one or more of the following: an encryption key or token for encrypting storage and persistence specifications that define when storage is to persist beyond the processing of the virtual machine; and having an identity service sign the storage data to bind it with the control data of the virtual distribution.

2. The method of claim 1 further comprising, storing the control data and the signed storage data in a data repository as the virtual distribution and which is retrievable via the virtual distribution identity.

3. The method of claim 1, further comprising adding image data to the virtual distribution that provides imaged versions of an operating system, services, and the storage designator for use with the virtual machine in the physical processing environment.

4. The method of claim 3, further comprising signing the control data, the signed storage data, and the image data as a configuration definition for the virtual distribution.

5. The method of claim 1, wherein defining further includes enlisting a storage resource manager to identify the port in response to one or more specifications.

6. The method of claim 5, further comprising receiving the port from the storage resource manager, wherein the port is associated with multiple storage volumes within the physical processing environment and multiple storage managers.

7. A method, comprising:

receiving a request to initiate a virtual distribution as a virtual machine within a physical processing environment and a physical machine;

verifying a signature of configuration data associated with the virtual distribution;

acquiring a virtual machine identity using a temporary identity housed in configuration data via interactions with one or more identity services;

contacting a storage resource manager to verify a storage port included for storage in the virtual machine, wherein the storage port is identified in the configuration data; and starting services identified in the configuration data for the virtual machine within the physical processing environment when the signature and the storage port are verified.

8. The method of claim 7 further comprising, communicating the storage port to a driver of the physical processing environment to establish a storage communication path from the virtual machine to physical storage of the physical processing environment.

9. The method of claim 7 further comprising:

receiving a move request to move the virtual distribution to a different physical processing environment and a different physical machine;

notifying the storage resource manager to stop permitting access from the virtual machine to the storage port; and modifying the configuration data for subsequent distribution to the different physical processing environment and the different physical machine and including at least a new storage port associated with the different physical processing environment.

10. The method of claim 7 further comprising:

receiving a copy request to copy the virtual distribution to a second virtual machine on the physical processing environment and the physical machine;

notifying the storage resource manager to permit the second virtual machine to access the storage port when policy permits;

copying the configuration data and acquiring another identity for the second virtual machine; and starting the second virtual machine.

11. The method of claim 7 further comprising:

receiving a termination request to terminate the virtual machine;

notifying the storage resource manager to stop permitting access from the virtual machine to the storage port; and stopping the services of the virtual machine.

12. The method of claim 11 further comprising, maintaining storage accessed by the virtual machine when persistence specifications existed in the configuration data after the services are stopped.

13. The method of claim 11 further comprising, clearing storage accessed by the virtual machine when persistence specifications did not exist in the configuration data after the services are stopped.

14. A system, comprising:

a storage resource manager implemented in a machine-accessible medium and to process on a machine; and a virtual machine definer implemented in the machine-accessible medium and to process on the machine, wherein the virtual machine definer is to define configuration data for a virtual machine to include processor and memory resources and to include a virtual machine identifier, and wherein the virtual machine definer is to interact with the storage resource manager to include a storage port for a target physical processing environment in the configuration data and to include a designator name associated with a particular resource imaged in the configuration data that assist in verifying the storage port when the virtual machine is initiated in the target physical processing environment, the virtual machine definer also includes one or more of the following in the configuration data: a key or token for storage encryption use with the virtual machine, persistence specifications for storage that is to persist beyond a life-cycle of the virtual machine, and a signature for the configuration data to verify the configuration data is unchanged when received in the target physical processing environment.

15. The system of claim 14 further comprising an orchestrator implemented in the machine-accessible medium and to process on the machine, wherein the orchestrator is to manage the configuration data as a virtual distribution.

16. The system of claim 14 further comprising, an identity service implemented in the machine-accessible medium and to process on the machine, wherein the identity service is to interact with the virtual machine definer to digitally sign one or more of the following: storage data associated with the storage port and the designator name; and the configuration data as a whole.

17. The system of claim 16, wherein the identity service is to further provide or assist in acquiring the virtual machine identifier.

18. The system of claim 14 further comprising one or more storage managers implemented in the machine-accessible medium and to process on the machine to interact with the storage resource manager and to supply the storage port.

19. A system, comprising:
  a virtual machine initiation service implemented in a machine-accessible medium and to process on a physical machine associated with a physical processing environment in which a virtual machine is to be initiated; and
  a storage resource manager implemented in the machine-accessible medium and to process on a machine, wherein the virtual machine initiation service is to acquire an identity for the virtual machine and verify configuration data for the virtual machine, and wherein the virtual machine initiation service is to interact with the storage resource manager to verify a storage port defined in the configuration data for use within the physical processing environment by the virtual machine, the storage resource manager and the virtual machine initiation service cooperate to perform one or more of the following operations: terminate the virtual machine, move the virtual machine to another different physical processing environment and different physical machine, and copy the virtual machine as a different virtual machine within the physical processing environment and the physical machine.

20. The system of claim 19, wherein the virtual machine initiation service is to initiate one or more additional services within the physical processing environment in response to imaged versions of those services included in the configuration data.

21. The system of claim 19 further comprising, an identity service implemented in the machine-accessible medium and to process on the machine and to assist in acquiring the identity for the virtual machine.

22. The system of claim 21 further comprising, a local physical distribution identity service implemented in the machine-accessible medium and to process on the physical machine, and wherein the local physical distribution identity service is to interact with the identity service to supply the identity for the virtual machine within the physical processing environment.

23. The system of claim 19 further comprising, one or more storage managers implemented in the machine-accessible medium and to process on the machine, wherein the one or more storage managers interact with the storage resource manager to provide paths to physical storage or to storage drivers when the virtual machine supplies storage instructions with reference to the storage port.

* * * * *

UNITED STATES PATENT AND TRADEMARK OFFICE
CERTIFICATE OF CORRECTION

PATENT NO.        : 7,793,101 B2                                                      Page 1 of 1
APPLICATION NO.   : 11/743357
DATED             : September 7, 2010
INVENTOR(S)       : Robert A. Wipfel et al.

It is certified that error appears in the above-identified patent and that said Letters Patent is hereby corrected as shown below:

In column 13, line 15, in Claim 1, delete "identity" and insert -- identify --, therefor.

Signed and Sealed this

Sixteenth Day of November, 2010

David J. Kappos
*Director of the United States Patent and Trademark Office*